UNITED STATES PATENT OFFICE.

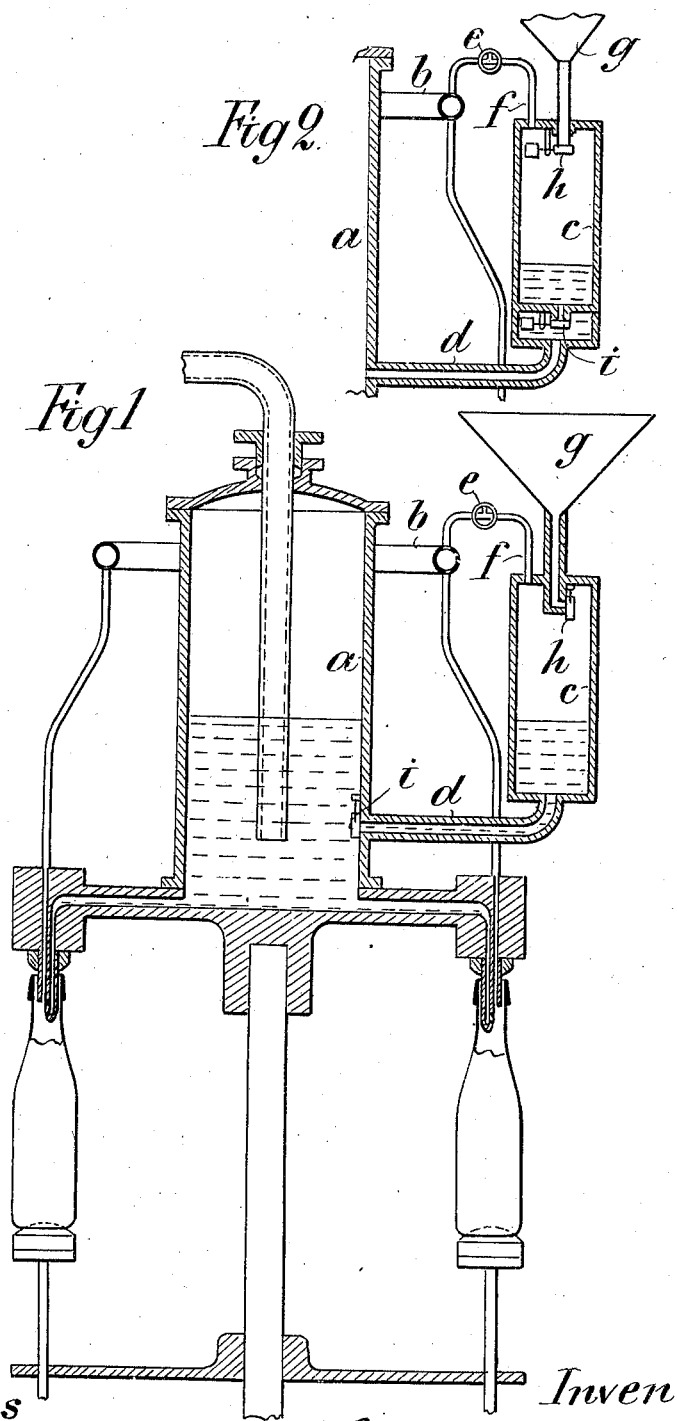

ANDERS ANDERSEN PINDSTOFTE, OF COPENHAGEN, DENMARK.

BOTTLING-MACHINE.

976,688. Specification of Letters Patent. Patented Nov. 22, 1910.

Application filed July 9, 1910. Serial No. 571,143.

*To all whom it may concern:*

Be it known that I, ANDERS ANDERSEN PINDSTOFTE, manufacturer, a subject of the Kingdom of Denmark, residing at No. 62 Frederiksberg Allé, in the city of Copenhagen, Denmark, have invented new and useful Improvements in Bottling-Machines, of which the following is a specification.

This invention relates to improvements in and relating to bottling machines and has for its object to minimize the loss of liquid due to the bursting or breaking of bottles during bottling.

According to this invention I provide a vessel with a filling funnel and connect the said vessel with the lower portion of the liquid receiver of the bottling machine, means being provided whereby the vessel can be placed either in communication with the air receiver of the bottling machine or with the atmosphere. Valves or the like are also provided for automatically preventing communication between the vessel and the funnel when the said vessel is in communication with the air container and for automatically preventing communication between the vessel and the liquid receiver when the said vessel is being filled and therefore in communication with the atmosphere.

The invention may be carried out as illustrated in the accompanying drawings in which—

Figure 1 is a section through a portion of a rotatable bottling machine provided with the new arrangement and Fig. 2 shows a modification.

In the drawings $c$ is a vessel connected to the lower portion of the liquid receiver $a$ by a pipe $d$, the vessel $c$ is also connected to the air receiver $b$ through a pipe $f$ and a three way cock $e$.

$g$ is a funnel leading into the vessel $c$ whose orifice is normally closed by a valve $h$.

$i$ is a valve for controlling communication between the receiver $a$ and the vessel $c$; in Fig. 1 this valve is shown within the receiver $a$ and in Fig. 2 at the bottom of the vessel $c$.

The arrangement works as follows:— Normally the three way cock $e$ is on such a position that there is communication between the air receiver $b$ and the vessel $c$ so that the pressure in the latter closes the valve $h$. The valve $i$ opens automatically when the pressure in the vessel $c$ is greater than that in the receiver $b$ and closes automatically when the reverse is the case so that differences in level in the two vessels are equalized. When in consequence of the bursting of a bottle it is desired to pour the remaining contents of the bottle into the vessel $c$, the three way cock $e$ is turned so that connection between the air receiver $b$ and the vessel $c$ is broken and simultaneously the vessel $c$ is placed in connection with the atmosphere. The pressure in the vessel $c$ is reduced and the valve $h$ can open when liquid is poured into the funnel $g$, while simultaneously the pressure in the receiver $a$ holds the valve $i$ closed. When the liquid has been poured in, the three way cock is again turned into the position in which it closes communication between the vessel $c$ and the atmosphere and places it in communication with the air container $b$ whereby the pressure of air in the vessel $c$ (which is now the same as in the receiver $a$) combined with the higher level caused by the pouring in of the liquid opens the valve $i$ so that liquid flows from the vessel $c$ into the receiver $a$ thus equalizing the level in the two vessels. A strainer is arranged in the funnel in order to prevent the passage of particles of glass.

The utility of the invention can be gaged by the fact that eight to ten bottles normally burst per day while filling, the liquid contained in them being wasted.

Claim.

In a bottling machine, the combination of a vessel provided with a funnel and communicating with the liquid receiver, means for placing said vessel in communication with either the air container or the atmosphere and automatic valves preventing communication between the vessel and the funnel when in communication with the air container and between the vessel and the liquid receiver when in communication with the atmosphere substantially as described.

In testimony whereof, I, ANDERS ANDERSEN PINDSTOFTE, have signed my name to this specification in the presence of two subscribing witnesses, this 28th day of June 1910.

ANDERS ANDERSEN PINDSTOFTE.

Witnesses:
VIGGO C. SCHUTZ,
HANOLD ANOST.